June 19, 1934.    H. L. VAN HORN ET AL    1,963,217
MILK OR OTHER BOTTLE EMPTYING MACHINE
Original Filed Dec. 26, 1930    3 Sheets-Sheet 2
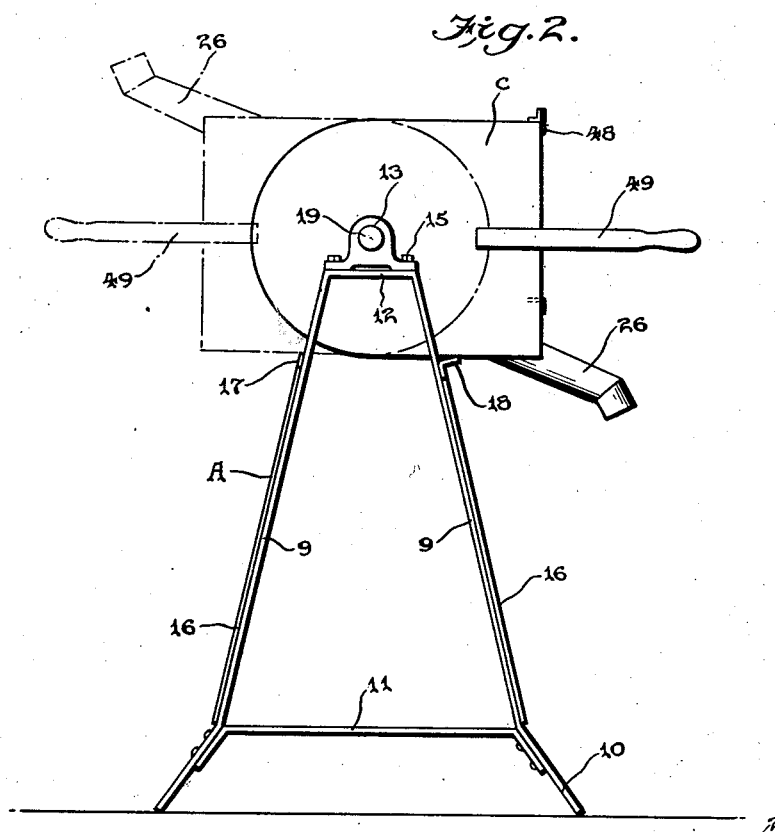
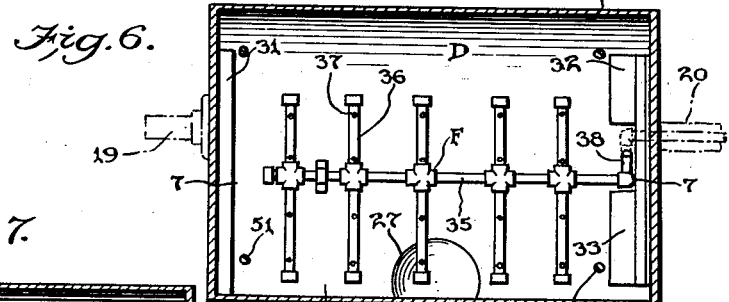
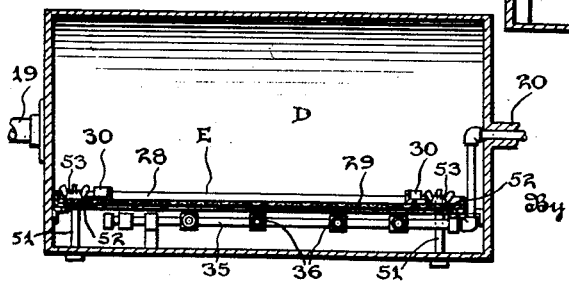

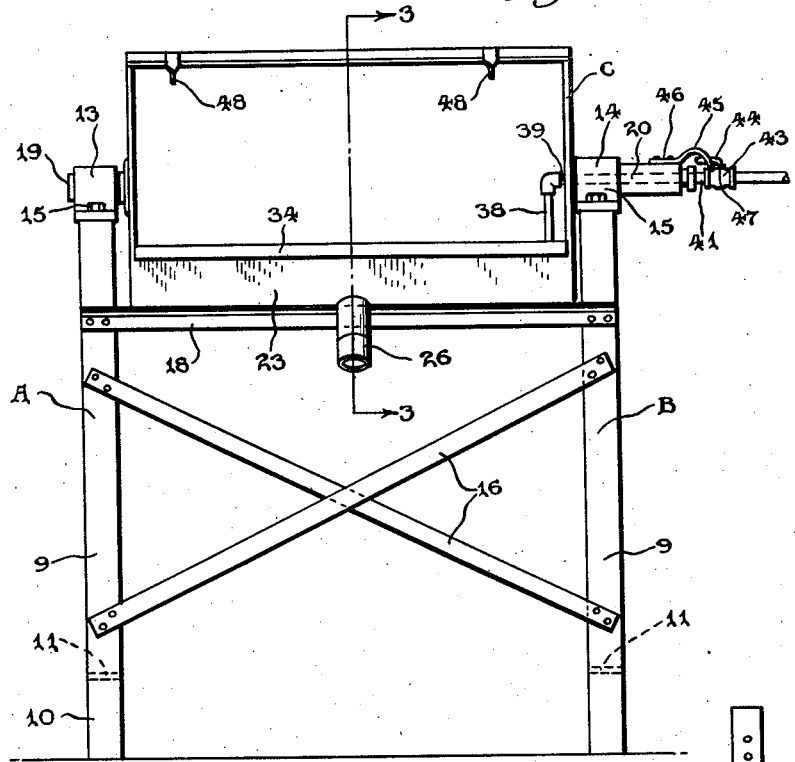

June 19, 1934.                H. L. VAN HORN ET AL                1,963,217
                         MILK OR OTHER BOTTLE EMPTYING MACHINE
                     Original Filed Dec. 26, 1930      3 Sheets-Sheet 3
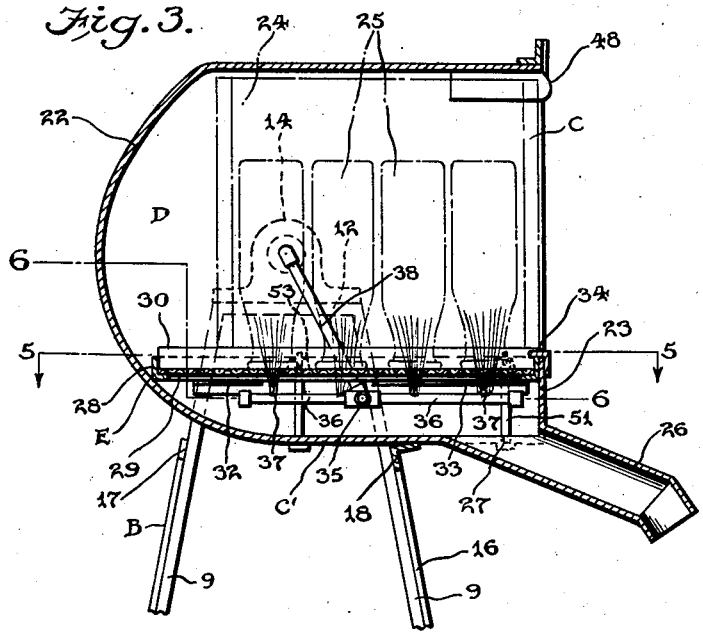
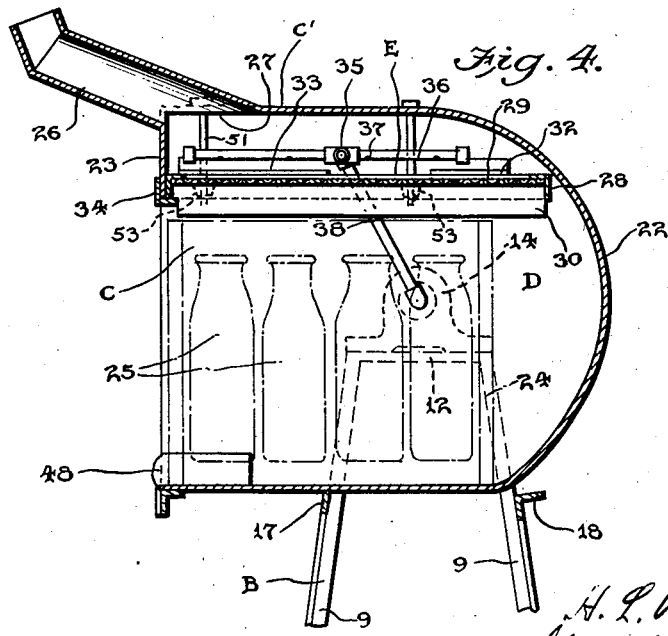

Patented June 19, 1934

1,963,217

UNITED STATES PATENT OFFICE 1,963,217

MILK OR OTHER BOTTLE EMPTYING MACHINE

Harry L. Van Horn, Oneida, N. Y., and George A. Weber, Louisville, Ky.

Application December 26, 1930, Serial No. 504,975
Renewed November 13, 1933

10 Claims. (Cl. 221—70)

This invention relates to apparatus for emptying milk or other bottles.

It is customary to carry more milk, cream or the like on milk routes in particular than is actually ordered or for supply to customers, this being done so as to be prepared to supply extra orders obtained after leaving the plant, and therefore, one object of the invention is to provide an apparatus designed to receive a crate of bottles containing milk or other commodity and operable to shift the crate so as to relieve the bottles of their contents without removing the bottles from the crate, thereby saving the time and labor usually required for taking the bottles separately out of the crate and replacing the empty bottles back in the crate after emptying same. The result is that when a driver returns to the dairy with his oversupply of milk or other commodity, the contents of the bottles may be readily removed from the bottles and emptied into one or more large receptacles and stored, and if desired, later returned to bottles positioned in the crate for transportation.

Moreover, during the winter season, dairies and others delivering milk in quantities experience inconveniences and hardships incident to the transportation of milk and similar commodities becoming frozen from the time they leave the dairy and deliver milk and similar commodities to residences and return to their starting point. It is the custom to carry more milk, cream or other commodities than it is expected to deliver along the route so as to be certain to have an ample supply for delivery and this over amount of commodity incident to cold weather, frequently freezes, and upon return to the starting point it is necessary to melt the frozen commodity, and to do it in a way not to cause loss of the milk, cream or other commodity, and in as sanitary and expeditious a manner as possible. Various methods have been practiced, but as far as is known, these methods have been unsatisfactory because of the laborious methods employed, and they have not been otherwise satisfactory, especially in large plants or dairies wherein numerous vehicles are employed to travel over different routes and because these numerous vehicles usually return to the dairy or starting point at practically the same time. It is for these reasons that the present invention has been produced, and it will be understood that under certain conditions one apparatus, such as herein described, may be sufficient, or that more than one apparatus may be employed to facilitate the melting of the frozen goods.

It may thus be gathered that one of the objects of the present invention is to provide a comparatively simple, inexpensive, durable and efficient apparatus, which may be easily, readily and economically operated for the emptying of milk or other bottles and for melting of milk, cream or other commodities, with as little loss of time as possible, and in a sanitary manner to save unnecessary loss of the commodities.

Another object of the invention resides in the provision of an apparatus of the nature stated, embodying among other characteristics, a receptacle which is mounted for a partial rotation and into which filled bottles may be disposed, after the closure caps or disks have been removed, and the bottles inverted and supported upon a screen in the receptacle and subjected to steam or other heating medium and under the influence of this medium, melted so as to permit the flow of the melted commodity through the screen and out of the receptacle.

Other minor objects result from the present apparatus and will be understood in the details of description of the invention.

In the drawings:—

Fig. 1 is a front elevation of the invention.

Fig. 2 is a side elevation.

Fig. 3 is a transverse sectional view on the line 3—3 of Fig. 1, showing the partially rotatable receptacle in one position.

Fig. 4 is a similar view showing the partially rotatable receptacle in another position.

Fig. 5 is a horizontal sectional view of the invention on the line 5—5 of Fig. 3.

Fig. 6 is a horizontal section view on the line 6—6 of Fig. 3.

Fig. 7 is a vertical sectional view through the partially rotatable receptacle.

Fig. 8 is an enlarged detail view, partly in section and partly in elevation illustrating particularly the means of steam or other heating medium supplied to the interior of the partially rotatable receptacle.

Referring now more particularly to the accompanying drawings, the invention involved is mounted upon a suitable framework or other support and as shown, the reference characters A and B indicate end frame members, each including upwardly converging leg portions 9 having deflected or other foot portions 10, a horizontal brace 11 and an upper head portion 12 for the support of suitable bearings 13 and 14 bolted or otherwise secured to the respective heads of the frame supports A and B, as indicated at 15. These end frame members or supports are connected together in any suitable manner, but as shown, by diagonal braces 16 and also by the horizontal braces 17 and 18, the braces being bolted or in any other suitable manner connected to the end frame members.

The receptacle C is journaled for a partial rotating movement in the bearings 13 and 14 in any suitable manner. As shown, a stub shaft 19 is journaled in the bearing 13 and its inner end is rigidly connected in any suitable manner to the respective or adjacent side of the receptacle C and a short hollow shaft 20 is journaled in the other bearing 14 and rigidly connected at its inner end to the adjacent side of the receptacle C. This hollow shaft 20 extends outwardly beyond the bearing 14 for a purpose presently explained and its hollow interior registers with an opening 21 in the side wall of the receptacle to which the hollow shaft 20 is connected.

The receptacle C is formed of metal or any other suitable material and it is hollow to provide a steam chamber D. Exteriorly and interiorly, the receptacle having said chamber is of rectangular formation, except at its rear end, where it is closed by a curved wall 22, the opposite side of the receptacle having a lower wall 23, with the upper edge of said wall 23 terminating relatively close to what is the bottom wall of the receptacle when the apparatus is in operation, the remaining portion of such side of the receptacle C being open to permit ready insertion and removal of crates 24 designed to contain milk or other fluid containing holders 25. A discharge spout 26 extends outwardly from the open end of the receptacle by way of an opening 27 so as to provide for a ready discharge of fluid from the steam chamber of the receptacle during operation of the apparatus, as will be later explained.

A screen E is disposed within the steam chamber of the receptacle C and may be of any convenient construction, but as shown, it consists of a metal or other rectangular frame composed preferably of angle iron, as indicated at 28 and on which is secured in any suitable manner, a screen composed preferably of heavy galvanized small mesh screen material 29, there being rearwardly diverging rails 30 of angle iron or other suitable material disposed transversely of the screen E and having their upper edges higher than the upper edges of the frame 28 of the screen E so as to receive and support the bottom of the crate 24 above the wire mesh 29 when the crate is inverted for the purpose of disposing the open ends of the bottles 25 on the wire mesh 29 and thereby prevent contact of the crate 24 with the wire mesh and obviate the possibility of expanding, denting or otherwise injuring the wire mesh by preventing contact of the crate with the mesh material.

The screen E is adapted to be removed from the steam chamber for cleaning or for other purposes and it is supported preferably on the three angle iron supports 31, 32 and 33, the two latter supports being secured to the inner side of one side wall of the receptacle C and the support 31 being secured in any suitable manner to the inner face of the opposite side of the receptacle C. An angle iron 34 is secured to the wall 23 at the upper edge of the latter and has one web portion overlapping the upper edge of the wall 23 and also the end of the tray-screen E, as shown particularly in Figs. 3 and 4, and which prevents accidental outward movement of the tray-screen E when the latter is supported in either of its two positions shown in Figs. 3 and 4, and yet permits ready removal of the screen E when desired for cleaning or for other reasons or purposes.

Steam or other frozen fluid melting medium, preferably steam, is supplied from a suitable steam supply source (not shown) to the chamber D of the receptacle C. The steam or other melting medium may be let into the steam chamber D in any suitable manner, but as shown, there is indicated, generally, a melting distributing medium system indicated at F, in the nature of a main pipe 35 provided with a plurality of branch pipes 36, the branch pipes 36 all having a plurality of perforations 37 in their surfaces opposite the screen E. The main pipe 35 has connection with a pipe 38 disposed adjacent one of the side walls of the receptacle C and located within the chamber D and this pipe 38 has a communicating connection with a pipe 39 which is mounted for partial rotating movement in the aforesaid opening 21 in the side of the receptacle C and which pipe 39 is journaled in this opening 21 and in the bore of the aforesaid hollow shaft 20.

The pipe 39 leads into a chamber 40 in the hollow shaft 20 and has its outer end abutting the main supply pipe 41 leading from the main source of steam or other melting medium, suitable packing material 40′ being disposed in said chamber 40 to maintain a tight joint between the abutting ends of the pipes 39 and 41 and being maintained tight through the instrumentality of the threaded gland nut 42 wherein there is constituted a common stuffing box to prevent leakage of the melting medium.

In the main pipe line 41 is a valve 43 of any suitable construction provided with an operating lever 44 adapted to be shifted by means of a finger 45 of an arm 46 bolted or otherwise secured to the hollow shaft 20 as shown, particularly in Fig. 8, and by virtue of which, in the operation of the device, the steam or other melting medium supply may be automatically turned on and off when required, the finger 45 having a bifurcation 47 whereby the finger 45 may straddle the lever 44 to actuate the valve 43 according to the direction of rotative movement of the hollow shaft 20.

It is the custom of dairies to supply the milk in bottles and to have these bottles mounted in crates and in cold weather, the driver of the truck or other vehicle returning to the dairy frequently finds that the milk in the bottles which constitutes his over supply to customers is frequently frozen. Various methods have been employed in efforts to melt the milk or the cream or both, as the case may be, and some of these methods have consumed considerable time and been very laborious, resulting not only in loss of time, but frequently in the loss of milk and cream.

Some of the methods employed have not always been satisfactory for other reasons. It has been for unsatisfactory methods heretofore realized that the present apparatus has been produced, and to carry out the invention, it will be noted that the receptacle C, prior to use, is generally in the position illustrated in Fig. 4, in any event, is in such position upon the starting of the melting operation in the use of the present apparatus. In such position, the clips 48 serve as guides to properly position the crate 24 in the chamber D, the crate being slid into the chamber D on the rails 30 which are entirely outside of the area of the screen E on which the open ends of the bottles are eventually to be disposed, it being understood that before the crate is inserted into the chamber D, that the usual disk caps are removed from the mouths of the bottles. The crate 24 with the bottles 25 therein having been positioned, as shown in Fig. 4, the next step is to grasp the handle 49 and partially rotate the receptacle C on its journaled shafts 19 and 20 until the rotative movement of the receptacle C is arrested by the horizontal brace 18 which constitutes a stop to engage the receptacle C and limit the said rotative movement and to maintain the receptacle C in a substantially horizontal position with the wall C' of the receptacle C sloping slightly toward the spout 26 to facilitate drainage. The pipe 39 being keyed at 50 to the hollow shaft 20, this pipe 39 is caused to partially rotate with the shaft 20 during this pivotal or turning movement of the receptacle C and at the proper time, the finger 45 of the arm 46 secured to the shaft 20, is caused to shift the lever 44 and operate the valve 43 to let in the steam into the steam chamber D from the supply source and through the pipe system F, as will be readily understood.

However, immediately prior to the let in of the steam, the crate 24 and the bottles 25 have been inverted with the open ends of the bottles 25 resting upon the wire mesh of screen 29, as shown particularly in Fig. 3 when the steam is injected into and around the bottles 25 resulting in a melting of the milk or other fluid, which flows through the screen E, and out of the chamber D through the discharge spout 26 into a suitable receptacle (not shown) arranged to receive the melted milk or other commodity flowing from the bottles 25 under the heating process described. When the milk has been melted, the handle 49 is grasped and the receptacle C swung back to its position, and the crate with the bottles therein is removed from the steam chamber D and the operation repeated as many times as is desired or necessary for the melting of the milk according to the quantity to be acted upon.

As shown in Fig. 4, in particular, there is comparatively little space between the crate 24 and the screen E and under the influence of rotative movement of the receptacle C, one end of the crate rides slowly on the curved wall 22 of the receptacle C and more or less gently falls on to the screen E and in such a manner as to prevent undue jarring and breakage of the bottles in the crate. The rails 30 are wholly outside of the area of the screen with which the open ends of the bottles contact with the screen and the aforesaid clips 48 prevent lateral movement of the crate to prevent the crate from contacting with the side walls of the receptacle and particularly to keep the crate out of contact with the pipe 38.

As means for further preventing lateral or outward movement of the screen and for the purpose of maintaining the screen in operative position when the receptacle C is swung to the position shown in Fig. 4, we may employ suitable means for connecting the screen to the adjacent wall C' of the chamber. To this end, we may employ, threaded bolts 51 having their outer ends fixedly connected to the said adjacent wall of the receptacle C, as by soldering or otherwise, and these bolts 51 preferably extend through openings 52 in the screen. Winged nuts 52 are adapted to have working fit with the threads of said bolts 51 so as to secure the screen against lateral or outward movement and against falling when elevated to the position shown in Fig. 4. By removing the winged nuts from said bolts, the screen may be moved from the flange 34 at the open front of the chamber C by forcing the inner end up on the curved rear wall 22 of said chamber, and the screen removed from the chamber for cleaning or other purposes.

It is believed that further comment need not be made with regard to the operation of the apparatus for it is thought that with the description hereinbefore given that any person skilled in the art will readily comprehend the operation of the apparatus, but it is to be understood that it is not desired to be confined to all of the specific details of the device, as illustrated and described, and with this thought in mind, it is to be understood that various changes may be made in the size, proportion and minor details, within the spirit of the invention so long as departure is not made from the real and true meaning of the langauge of the claims appended hereto, and that the apparatus is essential and highly serviceable for use even when the contents of the bottles is not frozen so as to employ the contents of the bottles without removing the bottles from their crates, thereby saving time and labor in removing the milk, cream or the like from the crates upon return of the driver to the plant. Furthermore, after the contents has flowed from the bottles or containers, the bottles or containers may be subjected to the action of steam in the chamber C for sterilizing purposes.

What is claimed is:

1. The method of melting milk or the like frozen in bottles which consists in removing the bottle caps, placing the bottles in a receptacle, inverting the bottles to permit flow of the contents thereupon when melted, subjecting the inverted bottles and their contents to the action of a heating medium in the receptacle to melt the contents of the bottles, straining the melted contents flowing from the bottles, and removing the contents of the bottles in liquid form.

2. An invertible receptacle provided with a discharge which, in one position of the receptacle, is disposed at the top thereof and, in another position of the receptacle, is located at the bottom thereof to permit draining the contents, a frame, said frame comprising end members between which the receptacle is pivotally supported, and horizontally disposed stop means attached to and extending from one of the said end members to the other end member below the receptacle to limit the pivotal movement of the receptacle in each direction.

3. An invertible receptacle provided with a discharge which, in one position of the receptacle, is disposed at the top thereof and, in another position of the receptacle, is located at the bottom thereof to permit draining the contents, said receptacle having an open front and an outwardly curved back, a frame pivotally supporting the receptacle, and front and rear stops on the frame below the receptacle to limit the pivotal movements of the receptacle and properly position the same, the curved back of the receptacle clearing one or the other of the said stops according to the direction of turning of the receptacle.

4. An invertible receptacle provided with a discharge which, in one position of the receptacle, is disposed at the top thereof and, in another position of the receptacle, is located at the bottom thereof to permit draining the contents, said receptacle having an open front and an outwardly curved back, a tray within the receptacle adjacent the side provided with the discharge, a cross piece extending over a side of the tray, and means preventing displacement of the tray during inverting of the receptacle.

5. An invertible receptacle provided with a discharge which, in one position of the receptacle, is disposed at the top thereof and, in another position of the receptacle, is located at the bottom thereof to permit draining the contents, a screen within the receptacle adjacent the side provided with the discharge, rails extending across the screen to suspend a crate, a pipe system within the receptacle adjacent the side provided with the discharge for supplying a fluid medium thereto, a supply pipe associated with the said pipe system and provided with a control valve, and means carried by the receptacle and engageable with the said valve to automatically open and close the same as the receptacle is reversed.

6. A invertible receptacle provided with a discharge which, in one position of the receptacle, is disposed at the top thereof and, in another position of the receptacle, is located at the bottom thereof to permit draining the contents, a screen within the receptacle adjacent the side provided with the discharge, and rails extending across the screen to suspend a crate.

7. An invertible receptacle provided with a discharge which, in one position of the receptacle, is disposed at the top thereof and, in another position of the receptacle, is located at the bottom thereof to permit draining the contents, said receptacle having an open front and an outwardly curved back, supports at the ends of the receptacle adjacent the side provided with the discharge, a screen insertable through the open front and suspended on the said supports, means for preventing displacement of the screen during reversing of the receptacle, and crate supporting rails extending across the screen.

8. An invertible receptacle provided with a discharge which, in one position of the receptacle, is disposed at the top thereof and, in another position of the receptacle, is located at the bottom thereof to permit draining the contents, a screen within the receptacle adjacent the side provided with the discharge, a pipe system between the screen and discharge side of the receptacle for supplying a fluid medium to the receptacle across and through the screen, and means for supplying a fluid medium to the pipe system.

9. An invertible receptacle having an open front and an outwardly curved back, a discharge spout extending forwardly from a side of the receptacle adjacent the open front, stop means for limiting the pivotal movements of the receptacle and properly position the same in each direction, a screen insertable through the open front of the receptacle, means removably supporting and securing the screen within and adjacent the discharge side of the receptacle, a perforated pipe system within the receptacle between the discharge side thereof and the screen, and means for supplying a fluid medium to the pipe system.

10. An invertible receptacle having means for supporting the receptacle in its upright and inverted positions, which invertible receptacle is constructed for receiving other receptacles to be inserted therein, which invertible receptacle is provided with a discharge which, in one position of the invertible receptacle, is disposed at the top thereof and which, in another position of the invertible receptacle, is located at the bottom thereof to permit draining of liquid contents from the interior of the receptacle, and means within the invertible receptacle adjacent the side provided with the discharge, upon which means inserted receptacles within the invertible receptacle may be supported after the invertible receptacle with the inserted receptacles therein has been inverted to bring the discharge to draining position.

HARRY L. VAN HORN.
GEO. A. WEBER.